United States Patent [19]

Miller

[11] Patent Number: 5,456,210
[45] Date of Patent: Oct. 10, 1995

[54] WATERING SYSTEM FOR POULTRY AND THE LIKE

[75] Inventor: Lavone L. Miller, New Paris, Ind.

[73] Assignee: CTB, Inc., Milford, Ind.

[21] Appl. No.: 202,354

[22] Filed: Feb. 28, 1994

[51] Int. Cl.[6] ................................................ A01K 7/06
[52] U.S. Cl. ................................................ 119/75; 137/592
[58] Field of Search ................................ 119/72, 74, 75, 119/78; 251/339, 321; 137/592

[56] References Cited

U.S. PATENT DOCUMENTS

| | | | |
|---|---|---|---|
| 3,415,229 | 12/1968 | Myers | 119/80 |
| 3,675,627 | 7/1972 | Myers | 119/72 |
| 4,282,831 | 8/1981 | Nilsen | 119/75 |
| 4,416,221 | 11/1983 | Novey | 119/75 X |
| 4,421,060 | 12/1983 | Frush et al. | 119/72.5 |
| 4,444,149 | 4/1984 | Shomer | 119/75 X |
| 4,450,789 | 5/1984 | Nilsen et al. | 119/18 |
| 4,527,513 | 7/1985 | Hart et al. | 119/51.5 |
| 4,779,571 | 10/1988 | Row | 119/75 |
| 4,896,629 | 1/1990 | Johnson | 119/72.5 |
| 5,070,817 | 12/1991 | Momont | 119/75 |
| 5,154,138 | 10/1992 | Siddiqui et al. | 119/72.5 |

Primary Examiner—Gene Mancene
Assistant Examiner—Thomas Price
Attorney, Agent, or Firm—Trexler, Bushnell, Giangiorgi & Blackstone, Ltd.

[57] ABSTRACT

A watering system for poultry and other animals which includes a watering cup having side walls and an opening defined in a lower base portion, a valve body positioned within the watering cup and connected to a water supply manifold, coupling and sealing apparatus for fastening the valve body and the watering cup to the manifold in a water-tight manner, and a plunger assembly positioned within the valve body for selectably controlling a flow of water from the manifold through and out of the valve body. Most importantly, the invention further includes a deflector bell mounted on the plunger assembly for developing and channeling one or more water jets into the watering cup after the valve has been opened by the watering poultry. The water jets are developed and directed into the watering cup by grooves formed in the deflector surface confronting the water flow emerging from the valve body. The jets of water have the effect of efficiently agitating the water in the cup and thereby suspending any debris present in the cup for consumption by the watering poultry.

6 Claims, 2 Drawing Sheets

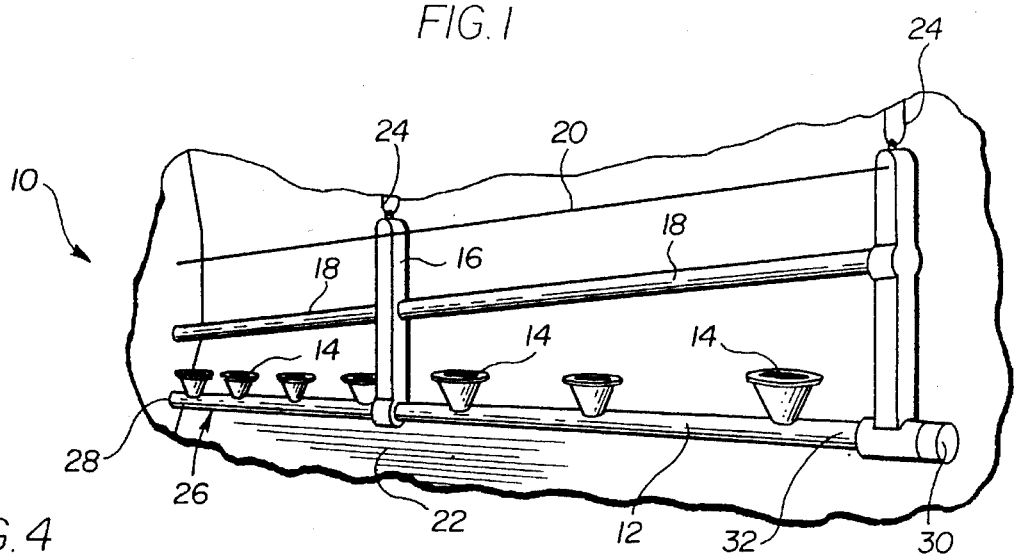
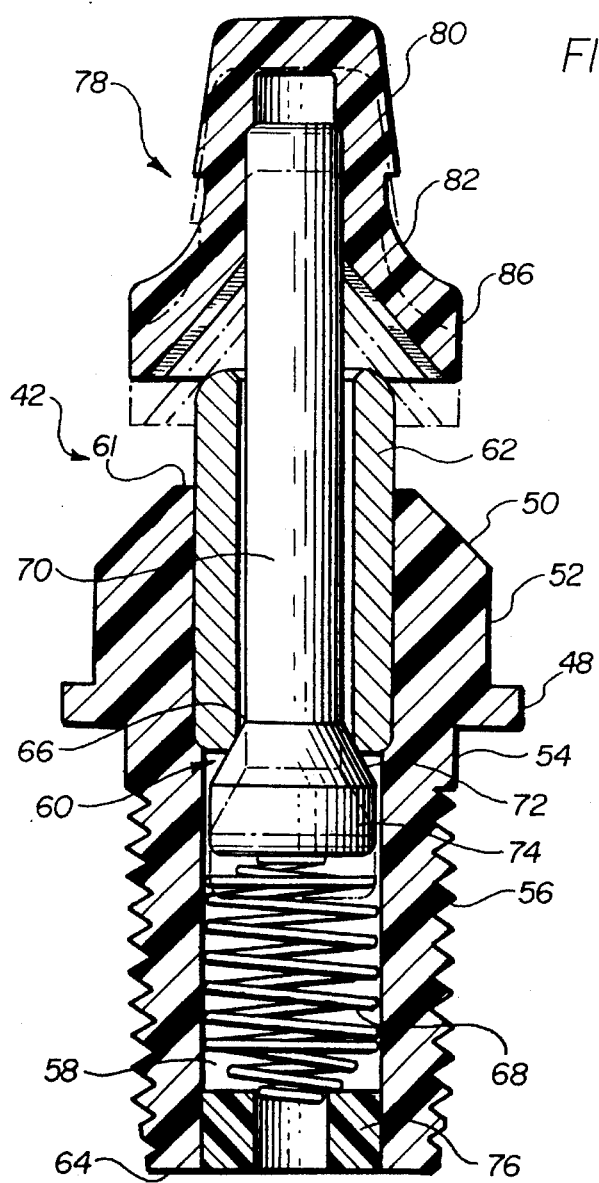
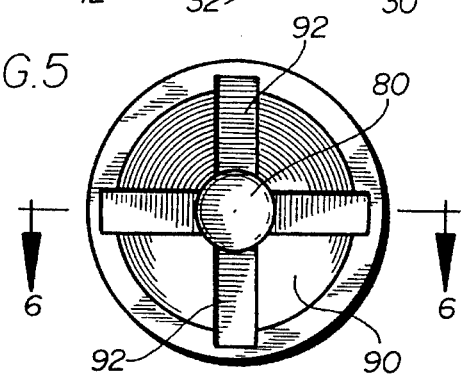
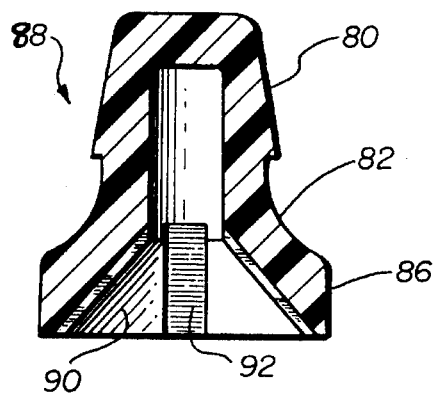
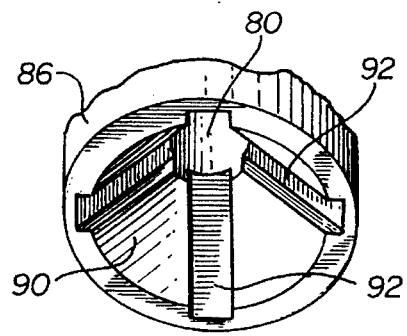

5,456,210

WATERING SYSTEM FOR POULTRY AND THE LIKE

BACKGROUND OF THE INVENTION a. Field of the Invention

In general, the present invention relates to watering equipment for birds and other animals. More specifically, the present invention relates to a watering system for more effectively watering poultry and the like which includes an improved valve assembly.

b. Description of Related Prior Art

Watering systems for delivering a fresh water supply to birds and other animals, particularly those being bred on a commercial basis, have been available for many years. However, there have been several problems associated with the available watering systems. With reference to the types of watering systems adapted specifically for watering flocks of poultry, for example, some of the most common problems are maintaining sanitary watering conditions, providing for easy access to the water supply, and preventing water leakage from the watering system.

One method of attempting to keep the watering system sanitary is by providing watering cups for the system that are self-cleaning with regard to food particles and other sediment that tends to build up in the cups over time. U.S. Pat. No. 5,070,817, for example, discloses watering cups wherein a flow of fresh water is directed downwardly by a deflector over a valve body having a concave surface into the watering cup component. The water flow pattern created lifts food particles and sediment present in the cup away from the bottom and temporarily suspends it for consumption by the watering flock.

OBJECTS AND SUMMARY OF THE INVENTION

It is a general objective of the present invention to provide an improved animal watering system.

It is a related objective to provide a watering system with superior self-cleaning features.

It is another related objective to provide a watering system which is easier for watering flocks to operate and gain access to a clean water supply.

It is still another related objective to provide a watering system which operates with a minimum amount of leakage and waste.

Other objects and advantages of the invention will become apparent upon reading the following detailed description, and upon reference to the drawings. Throughout the description, like reference numerals refer to like parts.

Stated briefly, the present invention comprises a watering system for poultry including a watering cup having upstanding sidewalls and an opening defined in a base portion thereof, a valve body having an orifice for receiving a flow of water from a supply and directing the flow of water through an outlet, the valve body projecting through the opening in the cup base and including means for coupling and sealing the valve body and the watering cup to the water supply, a plunger assembly operatively arranged within the valve body orifice for selectively controlling the flow of water through the orifice outlet, and a deflector having a substantially bell-like shape operatively associated with the plunger assembly for developing and channeling one or more water jets into the watering cup thereby more effectively agitating the water and temporarily suspending any food particles present in the cup.

BRIEF DESCRIPTION OF THE DRAWINGS

The features of the present invention which are believed to be novel are set forth with particularity in the appended claims. The organization and manner of operation of the invention together with further objects and advantages thereof may best be understood by reference to the following descriptions taken in connection with the accompanying drawings, in which:

FIG. 1 is a perspective view of a watering system incorporating the present invention;

FIG. 4 is an isolated and enlarged view of the valve component of the present invention;

FIG. 5 is a bottom view of a unique deflector component of the present invention;

FIG. 6 is a sectional view taken along line 6—6 of FIG. 5; and,

FIG. 7 is a perspective view of the deflector shown in FIGS. 5 and 6.

DETAILED DESCRIPTION OF THE PREFERRED EMBODIMENT

Figure 2:
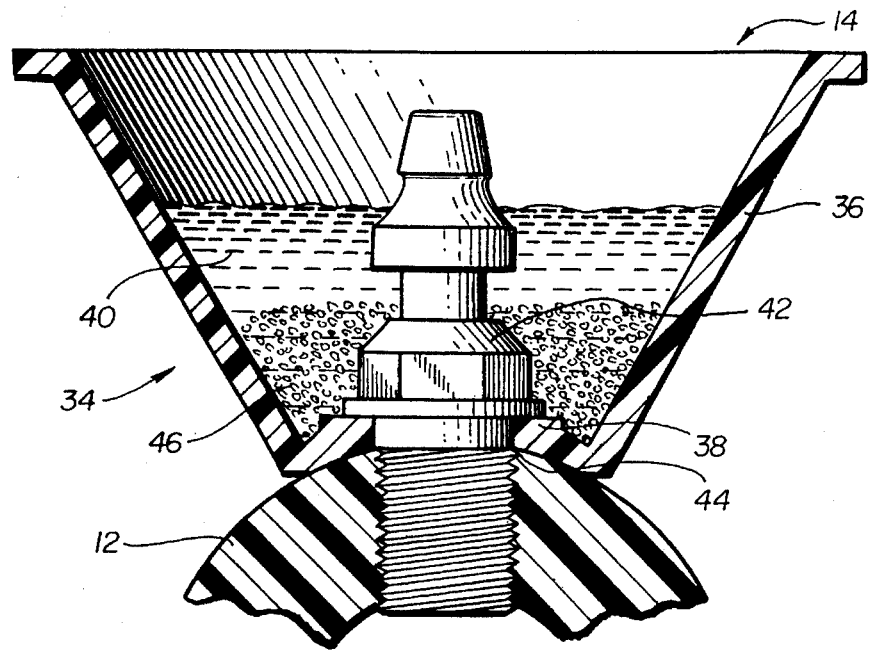
FIG. 2 is a partially fragmented side sectional view illustrating some of the components of the present invention and the sediment build-up problem in a watering cup component (which should not occur in the present system), with the valve component in a normally-closed position.

While the invention will be described in connection with a preferred embodiment, it will be understood that it is not intended to limit the invention to that embodiment. On the contrary, it is intended to cover all alternatives, modifications or equivalents as may be included within the spirit and scope of the invention.

For example, the improved watering system 10 as illustrated in FIG. 1 is located on a supply manifold 12 having eight (8) watering stations 14 spaced approximately one (1) foot apart. The improved system 10, however, can be used in a wide variety of arrangements ranging from a manifold 12 having only a single watering station 14 to those having hundreds of individual watering stations 14. Similarly, it is well known in the industry that the manifold 12 can be utilized in conjunction with a confinement cage arrangement (not shown), or apart therefrom as illustrated in FIG. 1, without departing from the scope of the invention.

With that understanding, it is further noted that the embodiment shown in FIG. 1 also includes a manifold support structure having hangers 16, channel supports 18 and an anti-roosting system 20 all of which is adjustably suspended above a feeding surface 22 by cables 24. A fresh water supply 26 is connected to an inlet end 28 of the manifold 12, and a drain cap 30 is provided over an outlet end 32. Usage in conjunction with a cage arrangement (not shown) would require known modifications to the manifold support structure.

Referring now to FIG. 2, there is shown a partially-fragmented side sectional view of a watering station 14. As illustrated, the watering station is shown to include a watering cup 34 having upstanding side walls 36 and a base portion 38 for retaining a limited supply of fresh water 40. Within the watering cup 34 is located a water valve 42, the details of which will be discussed below with primary reference to FIG. 4. The valve 42 passes through an opening 44 in the watering cup base portion 38 and is threaded into the manifold 12. Tightly securing the valve 42 into the manifold 12 seals both the valve 42 and the watering cup 34 against leakage. The exterior of the base portion 38 of the watering cup 34 is preferably designed to complement the exterior dimensions of the supply manifold 12 so as to ensure proper sealing and prevent rotation of the cup 34.

In FIG. 2, the valve 42 is illustrated in its normally-closed position, the limited supply of water 40 present in the cup 34 having entered during a previous opening of the valve 42. In addition to the limited supply of water 40, the watering cup 34 shown in FIG. 2 also contains a build-up of sediment 46 most likely consisting largely of food particles deposited earlier by watering poultry. It is important to note, however, that this sediment build-up 46 should not occur with the present watering system 10, as will be thoroughly discussed below. Rather, it is contemplated that only a minimal amount of sediment will ever be present in the watering cup 34. Accordingly, the sediment build-up 46 is shown to be present in FIG. 2 for the sole purpose of better understanding the operation of the present invention, as will become clear below, and not as an example of the sediment that can be expected to be found in the cup 34.

Figure 3:
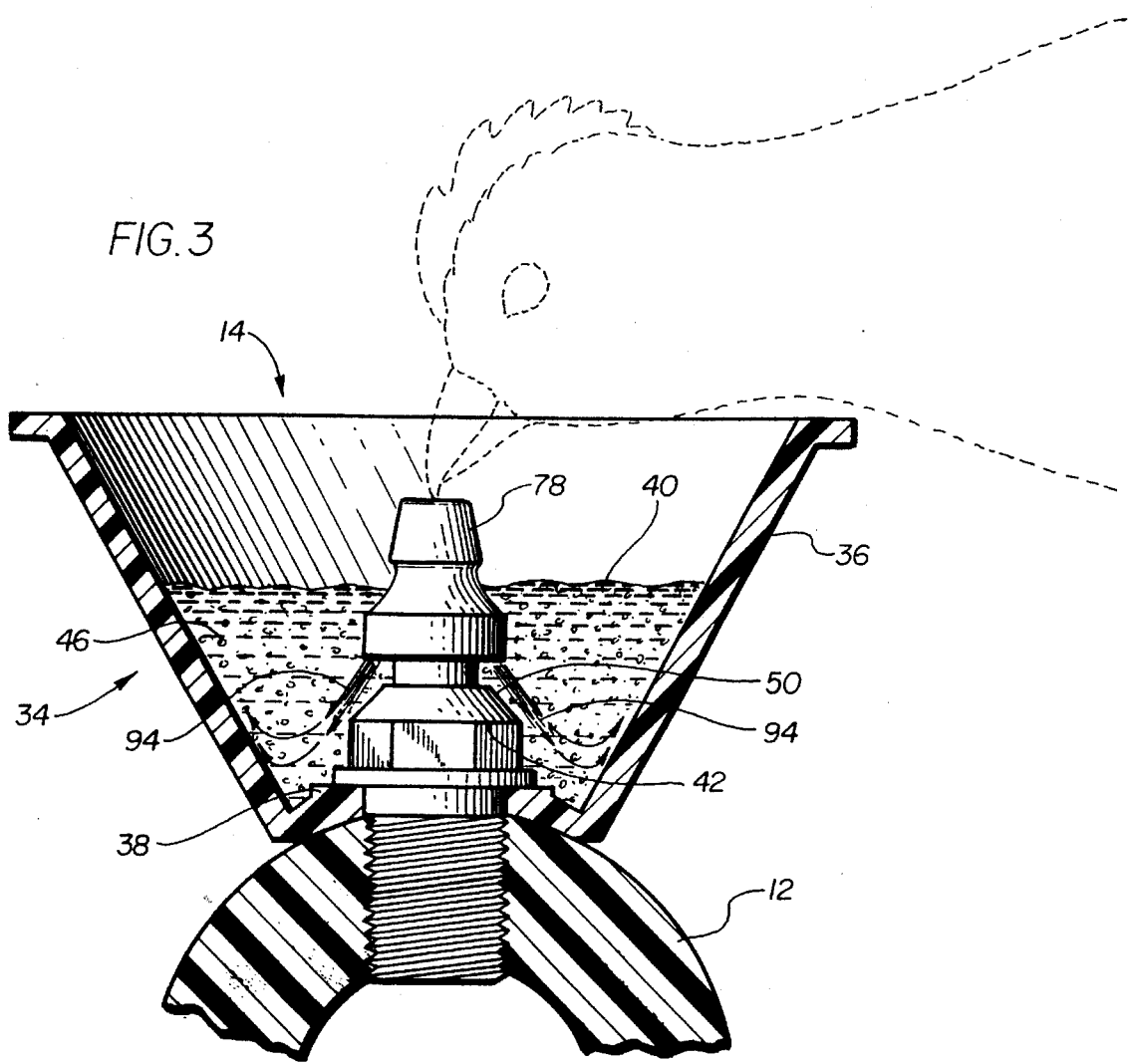
FIG. 3 is a partially fragmented side sectional view similar to FIG. 2, illustrating the improved self-cleaning feature of the present invention with the valve component in an open position.

In fact, with the valve 42 open as shown in FIG. 3, the watering system causes any sediment present in the cup 34 to be flushed away from any location where it has settled, agitated and suspended at least temporarily in such an efficient manner that any appreciable amount of sediment build-up 46, such as that shown in FIG. 2, is highly unlikely to thereafter occur. Rather, while temporarily suspended, the food particles and other sediment should be consumed by the watering flock of poultry.

Details of the unique valve 42 which causes the watering system 10 to operate in such an effective manner are shown in combination in FIG. 4. There it is seen that the valve 42 includes a valve body 48 having a convex dome portion 50 integrally formed with a polygonal base 52. Below the base 52, as shown in FIG. 4, the valve body 48 is seen to further comprise a body flange 54 having a threaded exterior part 56 used to mate with the manifold 12, as discussed above.

An orifice 58 is formed to extend through the entire length of the valve body 48, and a plunger assembly 60 is thereafter operatively arranged therein. The plunger assembly 60 includes a hollow sleeve 62 which is press-fit to extend down partially into an outlet end 61 of the valve body 48. Located below the sleeve 62, and above an inlet end 64 of the valve body 48, are a trigger pin 66 and spring 68. The trigger pin 66 is preferably machined from stainless steel and preferably includes an extended cylindrical shaft portion 70 having a diameter less than an inner diameter of the hollow sleeve 62, a conical intermediate portion 72 and a cylindrical base 74 having a diameter greater than the shaft portion 70, but less than the diameter of the valve body orifice 58.

So arranged, upward movement of the trigger pin 66 in the valve orifice 58 is limited by contact between the conical intermediate portion 72 of the trigger pin 66 and a lowermost portion of the sleeve 62. The plunger assembly 60 further includes a hollow bushing 76 which is press-fit into the inlet end 64 of the orifice 58 thereby retaining and partially compressing the spring 68 which thus urges contact between the trigger pin 66 and the sleeve 62 and maintains the valve 42 in a normally-closed position. Preferably, the sleeve 62 is also machined from stainless steel thus providing an effective water seal at the point of contact with the trigger pin 66.

In accordance with one of the main features of the present invention, the watering system 10 also includes a substantially bell-shaped deflector 78 operatively associated with the plunger assembly 60 as shown in-detail in FIGS. 5–7. The deflector 78 has a hollow cylindrical head 80 integrally joined along its exterior 88 to a concave hip 82 which extends downwardly and terminates in a cylindrical lip 86. The deflector 78 is press-fit onto the extended shaft portion 70 of the trigger pin 66 at the hollow head 80 as seen in FIG. 4. The bell-shaped deflector 78 is preferably formed of a plastics material and colored red or yellow for maximum attraction of the watering flock. As described, the exterior surface 88 of the bell-shaped deflector 78 provides a large striking surface for the poultry, while an interior mouth surface 90, which extends radially outward from the hollow of the head 80 contains one or more grooves 92, as best seen in FIGS. 5 and 7. The grooves 92 are preferably square-cornered in design and extend in each instance along substantially the entire interior mouth surface 90.

In operation, the flock of poultry is attracted to the watering system 10 by the color of the deflector 78. As depicted in FIG. 3, watering poultry insert their heads into the cups 34 to drink the water 40 and either accidentally bump or develop a learned response to peck the deflector 78. This causes the trigger pin 66 to move against the spring 68 separating the seal between the sleeve 62 and the conical intermediate portion 72 of the pin 66. Once this separation has occurred, water under pressure in the manifold 12 travels through the hollow bushing 76 and into the orifice 58 causing it to emerge from the sleeve 62. The emerging water next strikes the interior mouth surface 90 of the deflector 78 which contains the grooves 92. As illustrated in FIG. 3, the square-cornered grooves 92 channel the water into discreet water jets 94 and divert the jets 94 downward over the convex dome 50 of the valve body 48 and into the cup 34 in a circular motion as shown. The water jets 94 more effectively and efficiently agitate the water 40 in the cup 34 thereby suspending any debris 46 present therein for consumption by the watering flock.

Downward motion of the trigger pin 66 is limited by contact between the interior mouth surface 90 of the deflector 78 and an uppermost portion of the sleeve 62, as can be envisioned in FIG. 4. It is important to note, however, that this limit on the downward movement of the plunger assembly 60 and deflector 78 will not seal off the water jets 94 developed in the grooves 92 of the deflector 78, and therefore will not adversely effect the superior operation and improved self-cleaning characteristics of the watering system 10.

With the plunger assembly 60 and deflector 78 arranged as described above, the striking forces acting on the trigger pin 66 also sometimes tend to cause rotation of the pin. Upon rotation of the pin 66, the contact surface between the sleeve 62 and the conical portion 72 of the pin 66 is polished and cleaned thereby better insuring a tight seal when returned to its normally-closed position under the force of the spring 68. Rotation of the trigger pin 66 and the deflector 78 also improves the self-cleaning action of the cup 34 as described above by redirecting the water jets 94 to a different location in the cup upon each opening of the valve 42.

Moreover, because the watering system 10 of the present invention functions in a manner superior to any known in the art, the operating pressure of the water in the system can be significantly reduced without sacrificing results. For example, instead of requiring water in the system at 5 p.s.i., the present invention functions effectively with system water at only 1.5 p.s.i. Among other advantages, this reduction in pressure can significantly reduce leakage in the system, especially during lights-off hours and other periods of reduced water consumption.

The invention is claimed as follows:

1. A watering system for poultry and the like comprising:
   a. a watering cup having upstanding side walls and an opening defined in a base portion thereof;
   b. a valve body having an orifice for receiving a flow of water from a supply and directing the flow through the opening in the cup base and including means for coupling and sealing the valve body and the water cup to the water supply;
   c. a plunger assembly operatively arranged within the valve body orifice for selectively controlling the flow of water through the orifice outlet; and,
   d. a deflector having a substantially bell-like shape operatively associated with said plunger assembly, said deflector including means formed on an interior mouth surface thereof for developing and channeling one or more water jets into said watering cup thereby effectively agitating the water and temporarily suspending any food particles present in the cup.

2. The watering system as recited in claim 1, wherein said means for developing and channeling further comprise one or more grooves defined on an inside surface of said deflector.

3. The watering system as recited in claim 1, wherein said plunger assembly includes a trigger pin having a first part and a second part, both parts having dimensions smaller than a maximum dimension of said valve body orifice and one of said parts having a dimension larger than a minimum dimension of said orifice, such that said orifice can be selectively opened and closed by moving said trigger pin within said orifice.

4. The watering system as recited in claim 3, wherein the trigger pin is elastically held in normally-closed position and selectively, temporarily opened by forces exerted on said deflector by watering poultry and the like.

5. The watering system as recited in claim 4, wherein the forces exerted on said deflector by said watering poultry cannot inhibit the water jets emerging from the deflector into the watering cup.

6. The watering system as recited in claim 2, wherein said one or more grooves defined on an inside surface of said deflector are formed with square-corners.

* * * * *